(12) United States Patent
Arima

(10) Patent No.: US 6,513,087 B1
(45) Date of Patent: Jan. 28, 2003

(54) BUS TRANSFER APPARATUS

(75) Inventor: Yukio Arima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/570,466

(22) Filed: May 12, 2000

(30) Foreign Application Priority Data

May 14, 1999 (JP) ........................................... 11-134991

(51) Int. Cl.[7] ........................... G06F 13/00; G06F 13/41
(52) U.S. Cl. ...................................... 710/305; 710/100
(58) Field of Search ........................... 710/3, 4, 12, 20, 710/21, 33, 34, 52, 56, 57, 106, 100, 305

(56) References Cited

U.S. PATENT DOCUMENTS

| | | | |
|---|---|---|---|
| 4,759,014 A | * | 7/1988 | Decker et al. ................. 370/84 |
| 4,864,495 A | | 9/1989 | Inaba |
| 5,548,532 A | * | 8/1996 | Menand et al. .............. 345/514 |
| 5,613,003 A | * | 3/1997 | Bridgewater et al. ......... 380/20 |
| 5,784,462 A | * | 7/1998 | Tomida et al. ................. 380/21 |
| 6,108,692 A | * | 8/2000 | Van Seters et al. .......... 709/213 |
| 6,289,427 B1 | * | 9/2001 | Tanaka ........................ 711/201 |

* cited by examiner

Primary Examiner—Rupal Dharia
Assistant Examiner—Tim Vo
(74) Attorney, Agent, or Firm—Snell & Wilmer, LLP

(57) ABSTRACT

A bus transfer apparatus for receiving a packet and repeating the received packet, in which the packet includes a PREFIX portion indicating the head of the packet, a DATA portion storing data, and an END portion indicating the end of the packet, includes a control circuit for receiving the packet and outputting the PREFIX portion of the packet as a control signal; a counter for counting a time period during which the control circuit outputs the PREFIX portion, and outputting a counter full signal when the time period reaches a predetermined lower limit; an address pointer for determining a read address in response to the counter full signal; a data buffer for holding the DATA portion of the packet and outputting the DATA portion in accordance with the read address; an encoder for converting the DATA portion output from the data buffer to a predetermined format; and a first selector for selecting either the PREFIX portion output from the control circuit or the DATA portion output from the encoder. The output signal from the first selector is switched from the PREFIX portion of the packet to the DATA portion of the packet after the counter full signal is output from the counter.

7 Claims, 12 Drawing Sheets

BUS TRANSFER APPARATUS

BACKGROUND OF THE INVENTION

1. Field of the Invention

The present invention relates to a bus transfer apparatus provided at a communication node included in a computer network, and more particularly to a bus transfer apparatus for receiving and repeating a packet.

2. Description of the Related Art

Components included in computer systems are connected with each other via a bus such as a cable to transfer information between each component. This interconnection of the components of the computer systems leads to the formation of a network.

FIG. 9 is a diagram showing a structure of a component 60 included in a computer system. The component 60 is connected to other components via buses 66 and 67. The component 60 may be a disk drive, a keyboard, a printer, a computer itself, or the like. The buses 66 and 67 may be cables.

The component 60 includes a communication node 61 which performs data communication in accordance with a common communication protocol for a network; a device 62; and a device control apparatus 63 for controlling the device 62. When the component 60 is a disk drive, the device control apparatus 63 controls movement of a disk itself, or reading and writing of a disk.

The communication node 61 includes a protocol controller 64 and a bus transfer apparatus 65. The protocol controller 64 converts data (e.g., instructions) output from the device 62 to data having a format compliant with a communication protocol. The protocol controller 64 also converts transferred data having the format compliant with the communication protocol to data having a format which can be understood by the device 62. The bus transfer apparatus 65 controls data transfer on the buses 66 and 67 in accordance with the communication protocol.

In some networks, a port of a communication node is connected to a port of another communication node in a one-to-one correspondence. Tree-type networks and daisy-chain-type networks are known.

Such a connection structure of the communication nodes is defined by IEEE standard "1394 Standard for a High Performance Serial Bus". In this standard, a communication node receives a packet through a port and outputs the same packet as the received packet through another port. This operation is called a "repeat operation". The repeat operation allows a packet to be transferred to all communication nodes existing on a network.

Hereinafter, the repeat operation will be described with reference to FIGS. 10A through 10C.

FIG. 10A is a diagram showing a plurality of communication nodes connected to each other via cables. In FIG. 10A, reference numerals 40, 41, 42, 43, and 44 indicate communication nodes. Reference numerals 401, 402, 403, 404, 405, 406, 407, 408, and 409 indicate ports of the communication nodes. Reference numerals 410, 411, 412, and 413 indicate cables.

FIG. 10B shows the repeat operation of the communication node 41. The communication node 40 transmits a packet from the port 401. The packet is received through the port 402 by the communication node 41. To transfer the packet received through the port 402 to the entire network, the communication node 41 outputs the same packet as the received packet from the port 404. The packet received through the port 402 is repeated to the port 404 by the repeat operation of the communication node 41. In FIG. 10B, arrows 420 and 421 indicate directions in which the packet is transferred. The port 403 of the communication node 41 is not connected to a cable. The received packet is not repeated to the port 403.

FIG. 10C shows the repeat operation of the communication node 42. A packet is received through the port 405. The packet is then repeated to the ports 406 and 407. This repeat operation allows the packet to be transferred to the communication nodes 43 and 44. In FIG. 10C, arrows 421, 422, and 423 indicate directions in which the packet is transferred.

As described above, each communication node performs the repeat operation. This allows a packet transmitted by a given communication node to be transferred to the entire network. A received packet is latched within a communication node and it is then output in synchronization with an internal clock signal. This leads to minimization of attenuation of a signal due to transmission.

FIG. 11 shows an example of a configuration of a conventional bus transfer apparatus. The conventional bus transfer apparatus shown in FIG. 11 includes a control circuit 30, a decoder 31, a synchronization circuit 32, an encoder 33, and a selector 34.

FIG. 12A shows a typical structure of a packet which is input to the conventional bus transfer apparatus as an input signal. This packet is transferred between each communication node.

As shown in FIG. 12A, a packet includes a PREFIX portion 50 indicating the head of the packet, a DATA portion 51 storing data, and an END portion 52 indicating the end of the packet. The PREFIX portion 50, DATA portion 51, and END portion 52 of the packet are arranged in this order from the head of the packet.

Next, the operation of the conventional bus transfer apparatus when receiving a packet will be described with reference to FIG. 11.

An input signal is input to the control circuit 30 and the decoder 31.

The control circuit 30 constantly receives input signals on a cable and monitors the received signals. When the control circuit 30 receives the PREFIX portion 50 of a packet included in the input signal, the control circuit 30 outputs the PREFIX portion 50 to the selector 34 as a control signal. This triggers a repeat operation in which the packet is repeated to a port other than the receiving port.

The decoder 31 receives the PREFIX portion 50 of a packet included in the input signal. Then, the decoder 31 generates a clock signal which is to be used for receiving the DATA portion 51 of a packet (hereinafter referred to as a receiving clock signal). The decoder 31 latches data bits of the DATA portion 51 in synchronization with the receiving clock signal. The receiving clock signal may be generated by any method. In the IEEE 1394 standard, for example, the DATA portion 51 includes data and strobes supplementing the data. In this case, the receiving clock signal is generated by an exclusive OR of the data and strobe of the DATA portion 51.

The data bits latched in the decoder 31 are synchronized with a system clock signal used in a communication node by the synchronization circuit 32. Then, the data bits are output to the encoder 33.

The encoder 33 converts the DATA portion 51 to a predetermined format. The converted DATA portion 51 is output to the selector 34. The encoder 33 asserts a select signal to the selector 34 while the converted DATA portion 51 is being output to the selector 34. The asserted select signal indicates that the converted DATA portion 51 is being output to the selector 34.

The selector 34 normally selects a control signal output from the control circuit 30 and outputs the selected control signal as an output signal. When the select signal is asserted, the selector 34 selects the data bits output from the encoder 33 and outputs the selected data bits as an output signal.

In response to the select signal, the output signal of the selector 34 is switched from the PREFIX portion 50 to the DATA portion 51. Then, the control signal output from the control circuit 30 is switched from the PREFIX portion 50 indicating the head of a packet to the END portion 52 indicating the end of the packet. The switching of the control signal may be performed at any time during a time period when the encoder 33 is outputting the DATA portion 51. In the case of a concatenated packet in the IEEE 1394 protocol, for example, the last one bit of the DATA portion 51 decides which follows immediately after the DATA portion 51, the PREFIX portion 51 or the END portion 52. In such a case, the control circuit 30 monitors a signal indicating the end of data (hereinafter referred to as an end-of-data signal) which is output from the encoder 33 to determine whether to switch the control signal.

FIG. 12B shows a structure of a concatenated packet. As shown in FIG. 12B, a concatenated packet includes a concatenation of a plurality of DATA portions. One DATA portion is concatenated via a PREFIX portion with another DATA portion. The concatenated packet includes only one END portion which exists immediately after the last DATA portions.

The communication nodes belong to the respective domains which each have an independent clock signal. The period or phase of a clock signal varies among the communication nodes. When a communication node at the receiver has a clock signal different from that of a communication node at the transmitter, the communication node at the receiver recognizes the same packet as having a different length.

This point will be described with reference to FIGS. 13A and 13B.

FIG. 13A shows a configuration of a network for explanation. In FIG. 13A, reference numerals 70, 71, and 72 indicate communication nodes. Reference numerals 73 and 74 indicate cables.

FIG. 13B is a timing chart where the communication node 70 transmits a packet. In FIG. 13B, reference numeral 75 indicates a system clock signal used in the communication node 70; reference numeral 76 a signal on the cable 73 output from the communication node 70; reference numeral 77 a system clock signal used in the communication node 71; reference numeral 78 a signal output as a result from the latching and repeating of the signal on the cable 73 by the communication node 71; reference numeral 7a a PREFIX portion output from the communication node 70; reference numeral 7b a DATA portion output from the communication node 70; reference numeral 7c a PREFIX portion output as a result from the latching and repeating by the communication node 71; and reference numeral 7d a DATA portion output as a result from the latching and repeating by the communication node 71.

In the network shown in FIG. 13A, the communication node 70 transmits a packet. The communication node 71 then receives the packet and repeats the packet to the communication node 72.

It is now assumed that the communication node 70 begins to output a PREFIX portion at time t1 and then begins to output a DATA portion at time t2. When a system clock signal used in the communication node 71 has a longer period than the period of a system clock signal used in the communication node 70, the communication node 71 latches and repeats the PREFIX portion at a clock edge at time t3. The communication node 71 latches and repeats the DATA portion at a clock edge at time t4. When the system clock signal used in the communication node 70 has the same period as the period of the system clock signal used in the communication node 71, the PREFIX portion is repeated up to time t5. Due to the difference in a period, the time period len2 (3 clock cycles) during which the communication node 71 repeats the PREFIX portion becomes shorter than the time period len1 (4 clock cycles) during which the communication node 70 outputs the PREFIX portion.

As described above, as to the conventional bus transfer apparatus, there is a problem in that the repeat operation may cause the time period of the PREFIX portion of a packet to be shortened. In the daisy-chain type network, the repeat operation is repeated in a plurality of communication nodes, aggravating the above-described problem.

SUMMARY OF THE INVENTION

The bus transfer apparatus of this invention for receiving a packet and repeating the received packet, in which the packet includes a PREFIX portion indicating the head of the packet, a DATA portion storing data, and an END portion indicating the end of the packet, includes a control circuit for receiving the packet and outputting the PREFIX portion of the packet as a control signal; a counter for counting a time period during which the control circuit outputs the PREFIX portion, and outputting a counter full signal when the time period reaches a predetermined lower limit; an address pointer for determining a read address in response to the counter full signal; a data buffer for holding the DATA portion of the packet and outputting the DATA portion in accordance with the read address; an encoder for converting the DATA portion output from the data buffer to a predetermined format; and a first selector for selecting either, the PREFIX portion output from the control circuit or the DATA portion output from the encoder. The output signal from the first selector is switched from the PREFIX portion of the packet to the DATA portion of the packet after the counter full signal is output from the counter.

In one embodiment of this invention, the bus transfer apparatus further includes a receiving counter for storing the number of received packets; and a repeat counter for storing the number of repeated packets. The address pointer includes a plurality of address counters being selectively transitioned into an operating state in accordance with an output from the receiving counter; a second selector for selecting one of the plurality of address counters in accordance with an output from the repeat counter; an address holding circuit for holding an output from the second selector and outputting the output from the second selector as a read address in response to the counter full signal.

In one embodiment of this invention, the control circuit includes a first delay section for delaying the control signal; and a second delay section for delaying a trigger signal instructing initiation of counting.

In one embodiment of this invention, the control circuit further includes a comparison section for comparing an output from the receiving counter with an output from the repeat counter to determine whether repeat operation of the received packet is completed.

In one embodiment of this invention, the encoder outputs an end-of-data signal to the control circuit after converting the DATA portion to the predetermined format.

In one embodiment of this invention, the data buffer outputs a buffer empty signal to the address pointer after outputting all the DATA portion held in the data buffer.

In one embodiment of this invention, the address pointer renders the read address ineffective in response to the buffer empty signal.

Hereinafter, functions of the bus transfer apparatus will be described.

According to an aspect of this invention, the output signal from the selector of the bus transfer apparatus is switched from the PREFIX portion of a packet to the DATA portion of the packet after the counter outputs the counter full signal. The counter full signal is output when the time period during which the control circuit is outputting the PREFIX portion of the packet reaches the predetermined lower limit. This prevents the time period during which the control circuit is outputting the PREFIX portion of the repeated packet from becoming shorter than the lower limit. As a result, the lower limit of the time period during which the control circuit is outputting the PREFIX portion of the repeated packet is guaranteed.

According to another aspect of this invention, the address pointer includes a plurality of address counters. One of the plurality of address counters is selectively transitioned into an operating state. For this reason, even when a new packet is received before completion of the repeat operation, the lower limit of the time period during which the control circuit is outputting the PREFIX portion of the repeated packet is guaranteed.

According to still another aspect of this invention, the first delaying section for delaying output of the control signal and the second delaying section for delaying output of the trigger signal instructing the initiation of the counting are provided in the bus transfer apparatus. This prevents the time period during which the control circuit is outputting the PREFIX portion of the repeated packet from becoming longer than the upper limit. As a result, the upper limit of the time period during which the control circuit is outputting the PREFIX portion of the repeated packet is guaranteed.

Thus, the invention described herein makes possible the advantages of providing a bus transfer apparatus in which a lower limit of the time period of the PREFIX portion of a packet output by the repeat operation is guaranteed.

These and other advantages of the present invention will become apparent to those skilled in the art upon reading and understanding the following detailed description with reference to the accompanying figures.

DESCRIPTION OF THE PREFERRED EMBODIMENTS

Figure 12A:
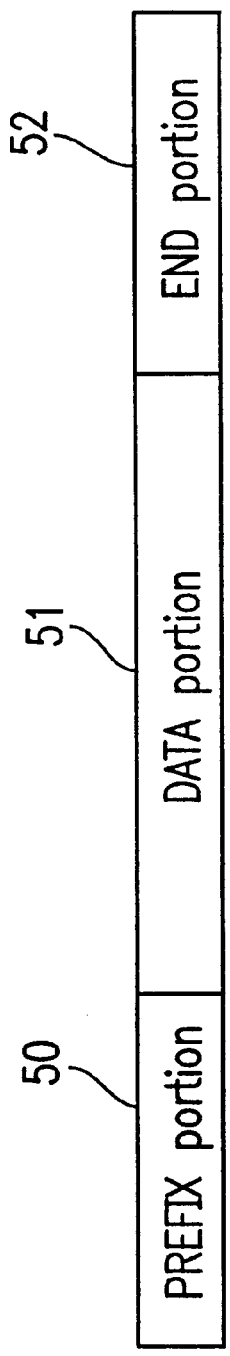
FIG. 12A is a diagram showing a structure of a packet.
Figure 12B:
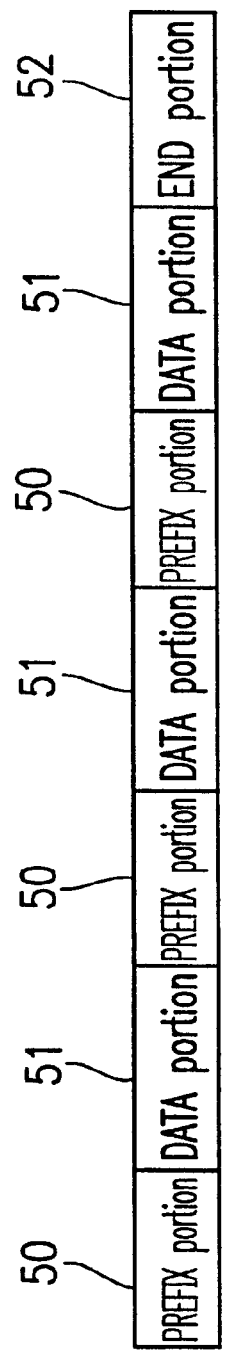
FIG. 12B is a diagram showing a structure of a packet.
Figure 13A:
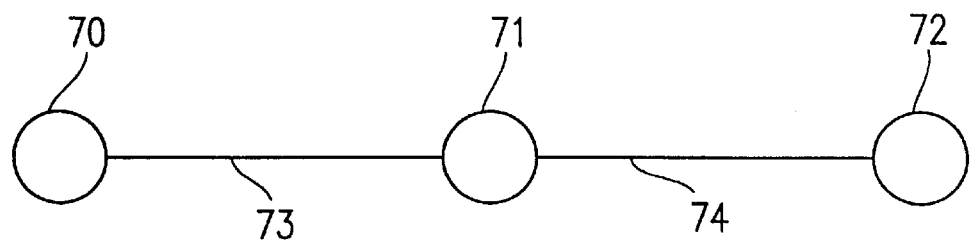
FIG. 13A is a diagram showing a configuration of a network for explanation.
Figure 13B:
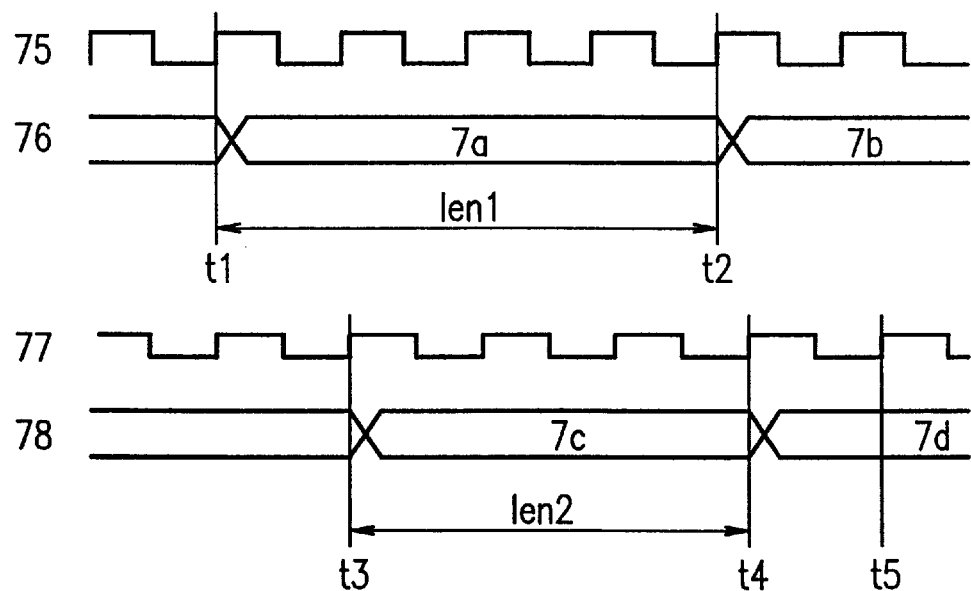
FIG. 13B is a timing chart when a communication node 70 transmits a packet.

Hereinafter, examples of the present invention will be described with reference to the accompanying drawings. In the following description, it is assumed that the period of a system clock signal used in a bus transfer apparatus transmitting a packet is longer than the period of a system clock signal used in another bus transfer apparatus receiving and repeating the packet. The packet has the same structure as described in FIGS. 12A and 12B. Under this assumption, delaying sections 133 and 134 shown in FIG. 2 are not necessarily required, but are used in connection with the description of FIG. 8.

Figure 1:
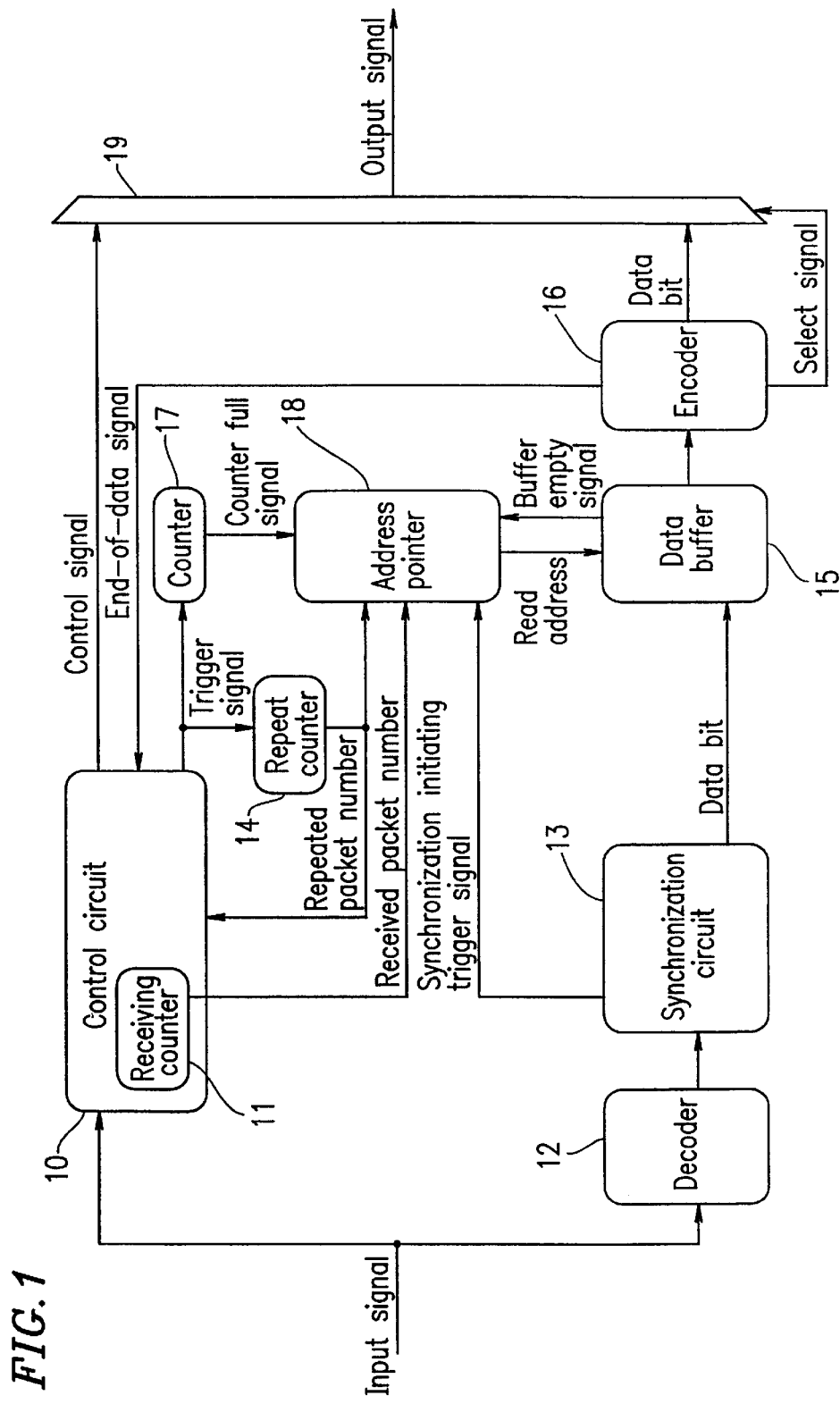
FIG. 1 is a diagram showing a configuration of a bus transfer apparatus according to an example of this invention.

FIG. 1 shows a configuration of a bus transfer apparatus according to an example of the present invention. As shown in FIG. 1, the bus transfer apparatus includes a control circuit 10 for generating a control signal based on an input signal; a receiving counter 11 for counting the number of received packets; a decoder 12 for generating a receiving clock signal based on the input signal and for holding data in synchronization with the receiving clock signal; a synchronization circuit 13 for holding the data held by the decoder 12 in synchronization with an internal clock signal; a repeat counter 14 for counting the number of repeat outputs; and a data buffer 15 for holding the data held by the synchronization circuit 13 and for outputting the data to a position indicated by a read address output from an address pointer 18 when the value of a counter 17 reaches a predetermined value. The bus transfer apparatus further includes an encoder 16 for converting the data output from the data buffer 15 to a predetermined format and for outputting the converted data and a select signal to a selector 19; a counter 17 for counting a time period during which the control circuit 10 is outputting the control signal; an address pointer 18 for storing the amount of the, data held by the synchronization circuit 13; and a selector 19 for selecting in response to the select signal either the control signal output from the control circuit 10 or the data output from the encoder 16 and for outputting the selected control signal or data as an output signal.

Figure 2:
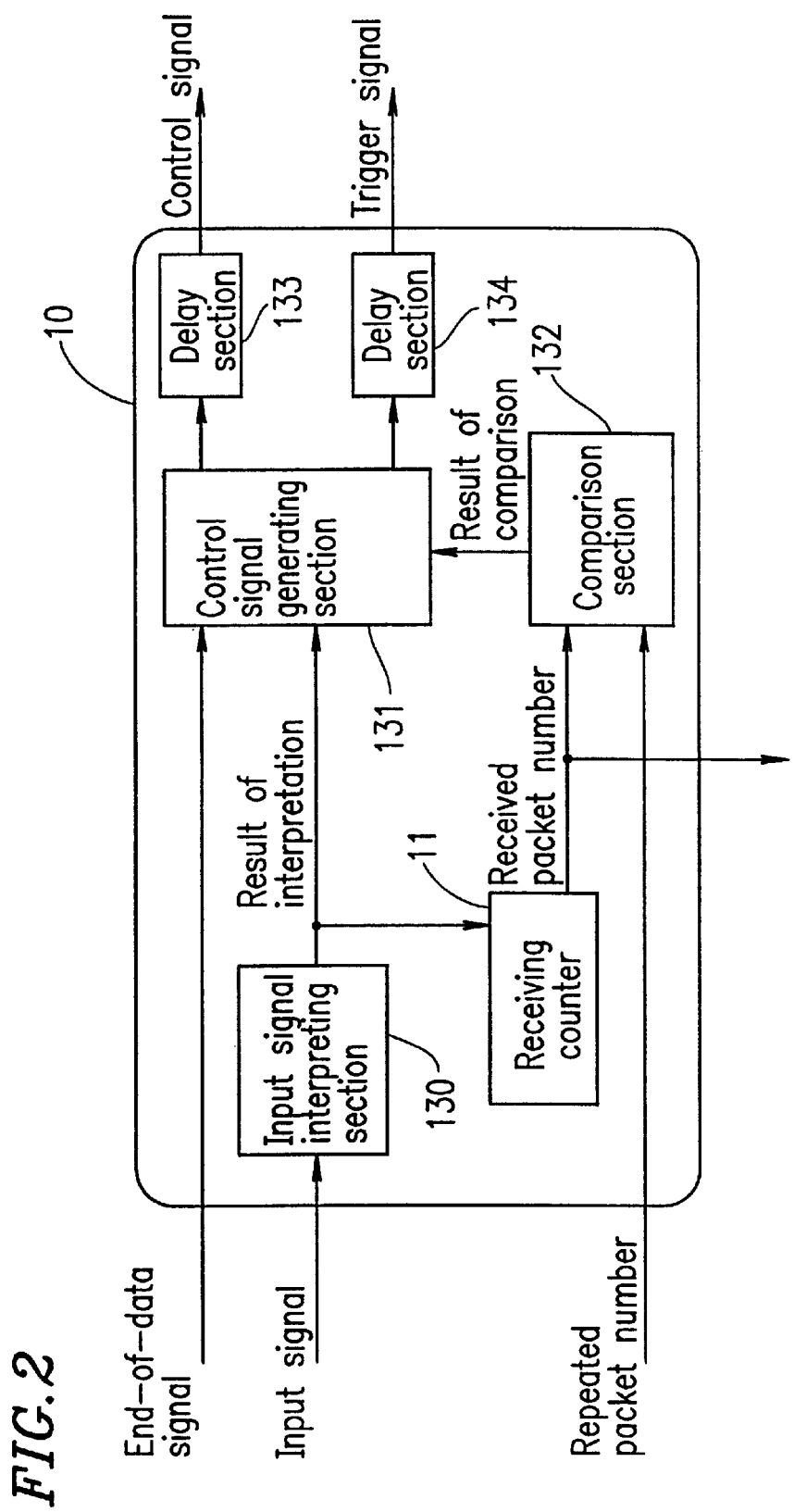
FIG. 2 is a diagram showing a configuration of a control circuit 10 shown in FIG. 1.

FIG. 2 shows a configuration of the control circuit 10 shown in FIG. 1. The control circuit 10 includes a input signal interpreting section 130 for interpreting an input signal; a control signal generating section 131 for generating and outputting a control signal in accordance with the result of interpretation by the input signal interpreting section 130; and a comparison section 132 for comparing the number of received packets and the number of repeated packets when receiving an end-of-data signal from the encoder 16 to determine whether a repeat operation is completed or not. The end-of-data signal is, for example, output when the encoder 16 completes the conversion of the DATA portion.

The input signal interpreting section 130 constantly monitors the input signal to interpret the type of the input signal received by the control circuit 10. The input signal includes all signals relating to bus arbitration as well as the PREFIX and END portions of a packet.

The value of the receiving counter 11 is updated when the input signal interpreting section 130 interprets that the PREFIX portion of a packet is received.

The control signal generating section 131 generates a control signal compliant with a predetermined communication protocol in response to the output of the input signal interpreting section 130. For the sake of simplicity, the case where the repeat operation in connection with the present invention is performed will be described.

The control signal generating section 131 determines whether the repeat operation needs to be performed, based on the result from the comparison output from the comparison section 132. Specifically, the control signal generating section 131 recognizes that the repeat operation is required when the result from the comparison shows that the number of received packets is different from the number of repeated packets. The control signal generating section 131 recognizes that the repeat operation is not required when the result from the comparison shows that the number of received packets is the same as the number of repeated packets. In the case when the bus transfer apparatus does not include the receiving counter 11 and the repeat counter 14, the control signal generating section 131 recognizes that the repeat operation is required when the input signal interpreting section 130 receives the PREFIX portion.

When the control signal generating section 131 recognizes that the repeat operation is required, the control signal generating section 131 examines the state of the bus transfer apparatus. As a result, when the bus transfer apparatus is ready to start the repeat operation, the control signal generating section 131 outputs the PREFIX portion as a control signal and also outputs a trigger signal instructing the initiation of counting to the repeat counter 14 and the counter 17.

Returning to FIG. 1, the value of the repeat counter 14 represents the number of repeated packets (hereinafter referred to as the repeat packet number). The value of the repeat counter 14 is updated when receiving the trigger signal instructing the initiation of counting from the control circuit 10. The repeat counter 14 transmits the repeat packet number to the control circuit 10 and the address pointer 18.

The counter 17 is used for counting the time period during which the PREFIX portion of a packet is being output. The value of the counter 17 is initialized when the counter 17 receives the trigger signal instructing the initiation of counting from the control circuit 10. The value is incremented in synchronization with a system clock signal. When the value of the counter 17 is equal to or greater than the predetermined lower limit, the counter 17 outputs a counter full signal to the address pointer 18.

The decoder 12 starts to generate a receiving clock signal when receiving the PREFIX portion of a packet as an input signal. The decoder 12 latches data bits using the receiving clock signal when receiving the DATA portion of the packet as an input signal. The receiving clock signal may be generated by any method. In the IEEE 1394 standard, for example, the receiving clock signal is generated based on data and strobes supplementing the data. Alternatively, the receiving clock signal is generated in constant synchronization with a driver of another bus transfer apparatus to which the current bus transfer apparatus transmits a signal.

The data bits latched by the decoder 12 are output in synchronization with the receiving clock signal asynchronous to the system clock signal of the bus transfer apparatus. The data bits are synchronized with the system clock signal of the communication node by the synchronization circuit 13. To this end, for example, a phase conversion is typically used. In the phase conversion, data is written to a write address of a buffer which is updated in synchronization with a receiving clock signal, and the data is read from a read address of the buffer which is updated in synchronization with a system clock signal. When the frequency of the receiving clock signal is different from the frequency of the system clock signal, a frequency conversion as well as the typical phase conversion may be used. Using these techniques, the synchronization circuit 13 converts the DATA portion of a packet to a format which allows the DATA portion to be transferred in synchronization with the system clock signal. When the data bits starts to be output to the data buffer 15, the synchronization circuit 13 outputs a synchronization initiating trigger signal to the address pointer 18. The synchronization initiating trigger signal indicates that the data bits starts to be output to the data buffer 15 in synchronization with the system clock signal.

The address pointer 18 constantly monitors the value of the receiving counter 11 and the value of the repeat counter 14. When receiving the synchronization initiating trigger signal from the synchronization circuit 13, the address pointer 18 selects an address counter corresponding to the value of the receiving counter 11 and counts the number of data bits stored in the data buffer 15 using the selected address counter. When receiving the counter full signal from the counter 17, the address pointer 18 holds the value of the address counter corresponding to the value of the repeat counter 14 and outputs the value of the address counter to the data buffer 15 as a read address. The read address needs to be held at least until the repeating of the DATA portion is completed. A read address is not determined during a time period from reception of the synchronization initiating trigger signal from the synchronization circuit 13 until reception of the counter full signal from the counter 17. During this time period, the address pointer 18 outputs a value ineffective to the data buffer 15 instead of a read address. An alternative way is to provide a circuit for generating a signal indicating to the address pointer 18 whether a read address is effective or ineffective. The signal is output to the data buffer 15.

Figure 3:
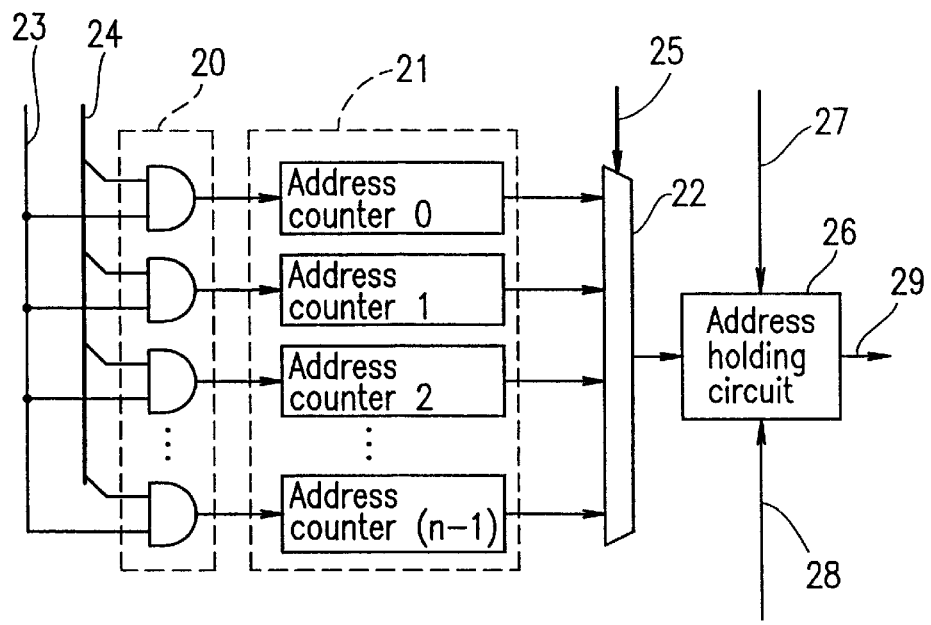
FIG. 3 is a diagram showing a configuration of an address pointer 18 shown in FIG. 1.

FIG. 3 shows a configuration of the address pointer 18 shown in FIG. 1. In FIG. 3, reference numeral 20 indicates a switch for selecting an address counter to be operated; reference numeral 21 an address counter for counting the data bits stored the data buffer 15; reference numeral 22 a selector for selecting the outputs of the address counter 21; reference numeral 23 the synchronization, initiating trigger signal; reference numeral 24 a signal for indicating the number of received packets; reference numeral 25 a signal for indicating the number of repeated packets; reference numeral 26 an address holding circuit for holding the read address; reference numeral 27 the count full signal; reference numeral 28 a buffer empty signal; and 29 the read address.

Figure 4:
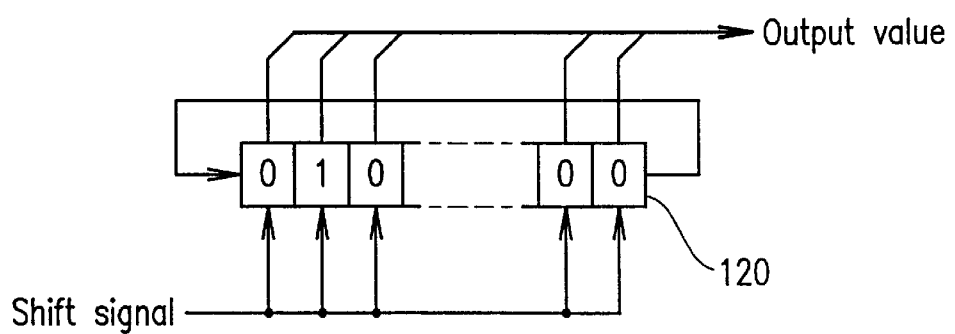
FIG. 4 is a diagram showing a configuration of a receiving counter 11 or a repeat counter 14 shown in FIG. 1.
Figure 5:
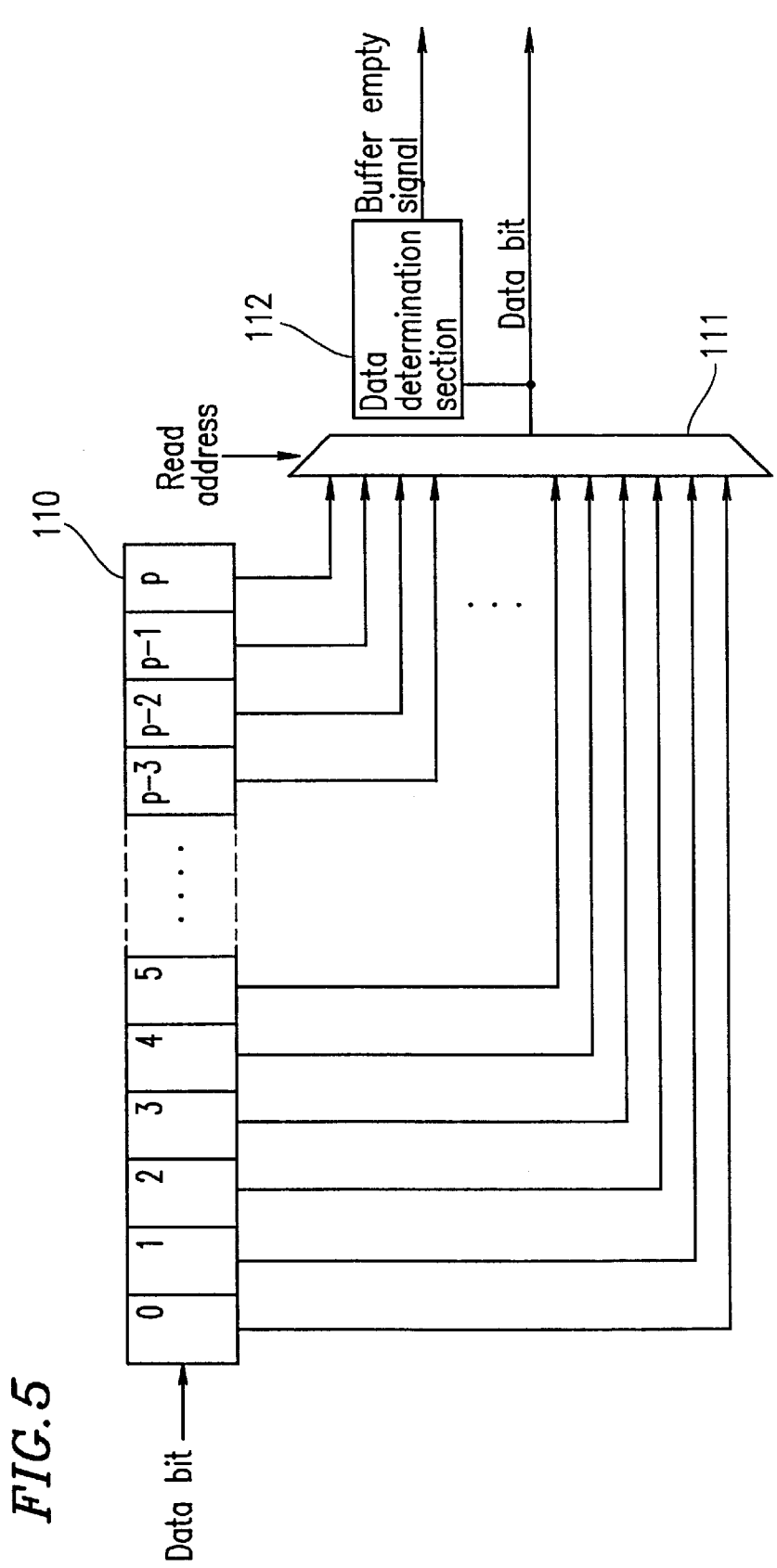
FIG. 5 is a diagram showing a configuration of a data buffer 15 shown in FIG. 1.

For the sake of simplicity, it is here assumed that the receiving counter 11 and the repeat counter 14 have a structure as shown in FIG. 4. Specifically, each of the receiving counter 11 and the repeat counter 14 has an n-bit shift register 120 (n=1, 2, 3, . . . ). In the shift register 120, any one of the n bits holds a "1" and the other bits hold a "0". When receiving a shift signal the shift register 120 shifts stored data by one bit in a predetermined direction (e.g., rightward in FIG. 4). In this case, a value held in the (n−1)th register (rightmost register in FIG. 4) is shifted to the 0th register (leftmost register in FIG. 4). In the receiving counter 11, the shift signal indicates reception of the PREFIX portion of a packet output from the input signal interpreting section 130. In the repeat counter 14, the shift signal is the trigger signal output from the control circuit 10. The initial value of the receiving counter 11 and the initial value of the repeat counter 14 need to be the same.

When receiving the synchronization initiating trigger signal 23 output from the synchronization circuit 13, the switch 20 selects an address counter m corresponding to the value of receiving counter 11 among n address counters 0 through (n−1) included in the address counter 21 where m=0, 1, 2, . . . , n−1. Only the selected address counter m is in operation. The other address counters which are not selected are disabled. For instance, it is assumed that the signal 24 indicating the number of received packets output from the receiving counter 11 is an n-bit signal, and only the m-th bit corresponding to the number of received packets has the value "1" while the other bits have the value "0". In this case, the m-th address counter m is selected. Thus, the synchronization initiating trigger signal 23 is transferred only to the address counter m by use of the switch 20.

Thereafter, the address counter m which has received the synchronization initiating trigger signal 23 is initialized before incrementing the value in synchronization with the system clock signal.

The address counter 21 may constantly perform the increment operation. Further, the increment operation of the address counter 21 may be stopped at any time after a read address has been determined. Preferably, the increment operation is stopped and the address counter 21 is initialized after the address counter 21 has reached the maximum value (i.e., the maximum address of the data buffer 15).

The selector 22 selects an output among n outputs of the address counters 0 through (n−1) included in the address counter 21 which corresponds to the signal 25 indicating the number of repeated packets. The selected output is output to the address holding circuit 26. The signal 25 indicating the number of repeated packets is an n-bit signal as is the signal 24 indicating the number of received packets. In the n bits of the signal 25, only the k-th bit corresponding to the number of repeated packets (k=0, 1, 2, . . . , (n−1)) has the value "1" while the other bits have the value "0".

The address holding circuit 26 holds a value ineffective to the data buffer 15 as an initial value. When receiving the counter full signal 27, the address holding circuit 26 holds an output of the selector 22 and outputs the output as the read address 29. The value of the address holding circuit 26 is held until reception of the buffer empty signal 28. The value is initialized when the address holding circuit 26 receives the buffer empty signal 28.

Returning to FIG. 1, the data buffer 15 holds the DATA portion of a packet which is synchronized with the system clock signal by the synchronization circuit 13. The data buffer 15 is capable of holding the data bits transferred from the synchronization circuit 13. The data buffer 15 may have any structure as long as the data bits can be held and read out. It is here assumed that the data buffer 15 has a structure shown in FIG. 15. Specifically, the data buffer 15 includes a shift register 110 for holding data; a selector 111 for selecting an output corresponding to a read address among the outputs of a plurality of registers included in the shift register 110; and a data determination section 112 for monitoring the outputs of the selector 111 and for determining whether all of the data bits have been output.

A data bit transferred from the synchronization circuit 13 is first stored at the 0th address of the shift register 110. The data bit is then sequentially shifted to the following address in synchronization with the system clock signal. When the address pointer 18 (i.e., the address counter 21) also operates in synchronization with the system clock signal, a read address output by the address pointer 18 indicates an address at which the data bit which is the first to be stored in the data buffer 15 is currently stored. The size of the shift register 110 is equal to the maximum, payload of a packet at the largest. The shift register 110 may have a size which is sufficient to hold an amount of data bits which have been synchronized during a time period from output of the synchronization initiating trigger signal until output of counter full signal.

The value output from the data buffer 15 is determined by the selector 111. The selector 111 does not output data to the encoder 16 when a read address output from the address pointer 18 is ineffective. When receiving a read address having an effective value, the selector 111 outputs data stored at a position indicated by the read address to the encoder 16. After all the data bits have been output and the output of the selector 111 is no longer an effective data bit, the data determination section 112 output the buffer empty signal to the address pointer 18. The address pointer 18 renders the read address ineffective.

The encoder 16 converts the data bits output from the data buffer 15 to a predetermined format before outputting the data bits. The encoder 16 asserts the select signal to indicate that the data bits are output to the selector 19. The selector 19 normally selects the control signal output from the control circuit 10 and outputs the selected control signal. In the case that the select signal is asserted, the selector 19 selects the data bits output from the encoder 16 and outputs the selected data bits.

When the output signal of the selector 19 is switched from the PREFIX portion to the DATA portion in response to the select signal, the control signal output from the control signal generating section 131 (FIG. 2) of the control circuit 10 is switched from the PREFIX portion indicating the head of a packet to the END portion indicating the end of the packet. The switching of the control signal may be performed at any time in a time period during which the encoder 16 is outputting the DATA portion. However, when the last one bit of the DATA portion decides which follows immediately after the DATA portion, the PREFIX portion or the END portion (e.g., the concatenated packet in the IEEE 1394 protocol), the state of the encoder 16 is typically monitored and determined using an end-of-data signal.

When receiving the end-of-data signal the control signal generating section 131 (FIG. 2) of the control circuit 10 outputs the END portion for a given time period and ends the outputting of the control signal. In this case, the comparison section 132 (FIG. 2) refers to the value of the receiving counter 11 and the value of the repeat counter 14 and compares these values with each other to determine whether all the received packets have been repeated. When all the received packets have been repeated (i.e., the value of the receiving counter 11 (the number of received packets) is equal to the value of the repeat counter 14 (the number of repeat packets)), the process is ended. If not, the control signal generating section 131 outputs a new PREFIX portion as the control signal as well as a trigger signal for initiating the counting of the period of time during the outputting of the PREFIX portion. Thereafter, the above-described processing is repeated until all the received packets have been repeated.

Figure 6:
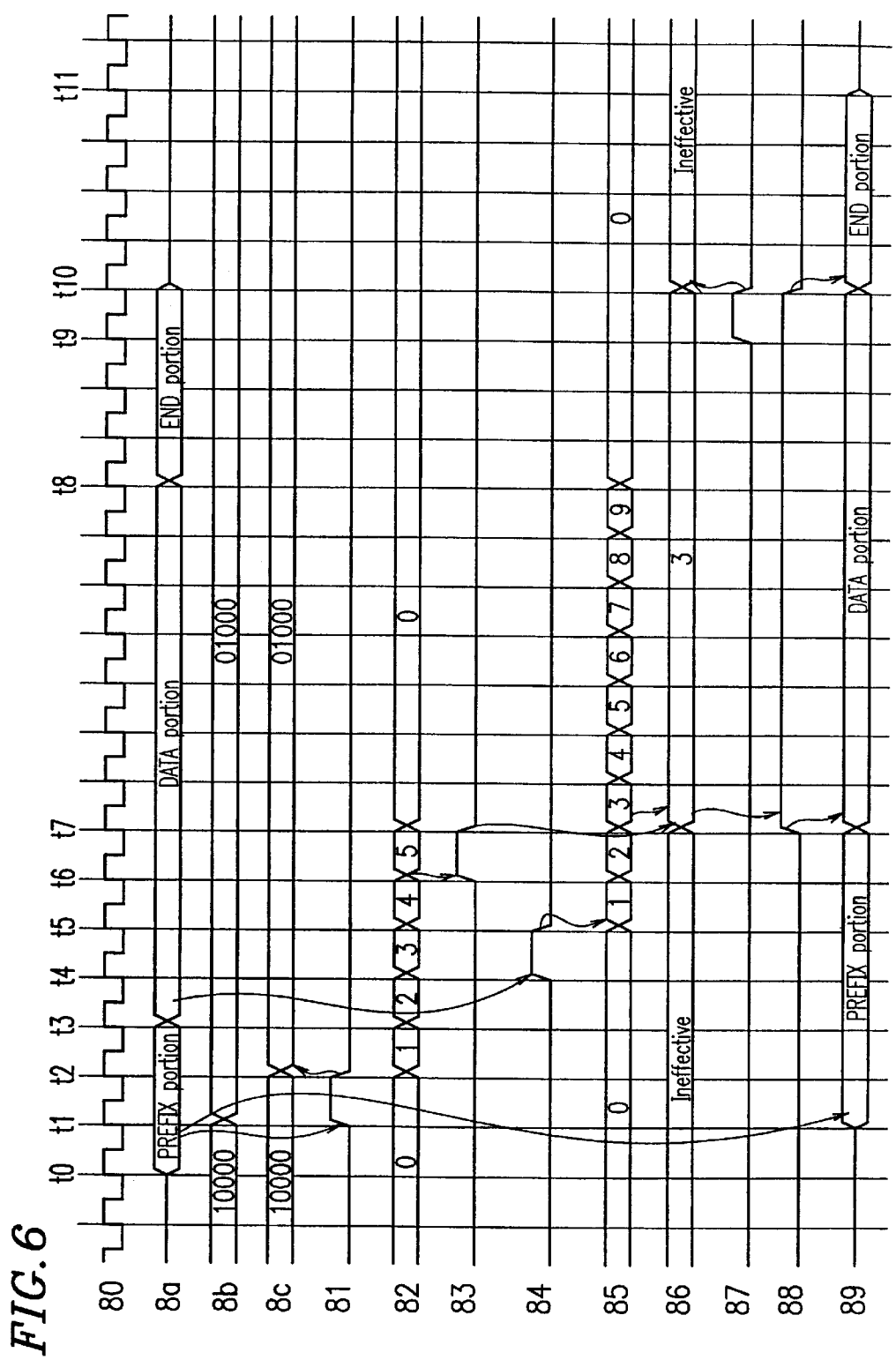
FIG. 6 is a timing chart showing timing of operation in a bus transfer apparatus according to this invention.

FIG. 6 is a timing chart indicating the operational timing of the bus transfer apparatus according to this invention. In FIG. 6, reference numeral 80 indicates a system clock signal; reference numeral 81 a trigger signal for indicating that the control circuit 10 begins to output the control signal; reference numeral 82 a value of the counter 17; reference numeral 83 a counter full signal for indicating that the counter 17 reaches a predetermined value; reference numeral 84 a synchronization initiating trigger signal output from the synchronization circuit 13; reference numeral 85 a value of the address counter 21 counting the number of data bits stored in the data buffer in the address pointer 18; reference numeral 86 a read address; reference numeral 87 a buffer empty signal; reference numeral 88 a select signal output from the encoder 16; reference numeral 89 a signal output from the selector 19 as a repeated output; reference numeral 8a a packet which is received through a receiving port and latched using the system clock 80; reference numeral 8b an output from the receiving counter 11 indicating the number of received packets; and reference numeral 8c an output from the repeat counter 14 indicating the number of repeated packets.

For the sake of simplicity, it is assumed that the receiving counter 11 and the repeat counter 14 each have a five-bit register; and the maximum address of the data buffer 15 is 9.

The bus transfer apparatus constantly monitors an input signal in synchronization with the system clock signal. A packet is transmitted to the bus transfer apparatus. Subsequently, when recognizing reception of the PREFIX portion at time t0, the control circuit 10 updates the value 8b of the receiving counter 11 to 01000 in the next clock cycle (time t1). At this time, the value 8c of the repeat counter 14 is 10000. The comparison section 132 output a result from comparison of the value 8b and the value 8c which indicates that the value 8b and the value 8c are different from each other. The control signal generating section 131 receives this result from the comparison section 132 and recognizes that a repeat operation is required. The control signal generating section 131 then outputs the trigger signal 81 to the counter 17. At the same time, the control signal generating section 131 outputs the PREFIX portion to the selector 19 as the repeated output 89. The repeat counter 14 receives the trigger signal 81 and updates the value 8c to 01000 (time t2).

The counter 17 receives the trigger signal 81 and begins to increment so as to count the period of time during the outputting of the PREFIX portion. The value of the counter 17 changes as does the signal 82. The PREFIX portion has a predetermined time period which corresponds to the predetermined value of the counter 17 which is here assumed to be five. When the value 82 of the counter 17 reaches five, the counter 17 outputs the counter full signal 83 (time t6).

The synchronization circuit 13 monitors outputs of the decoder 12. At time t3, the synchronization circuit 13 begins to receive the DATA portion of a packet and also begins synchronization. In the next clock cycle (i.e., at time t4), the synchronization circuit 13 outputs the synchronization initiating trigger signal 84.

The address pointer 18 receives the synchronization initiating trigger signal 84 and operates an address counter of the address counter 21 corresponding to the output value 8c of the repeat counter 14. The output value of the address counter 21 is the signal 85. The read address 86 as an output of the address pointer 18 has an ineffective value until the counter full signal is output. When the counter full signal is output at time t6, the read address 86 holds the value three which is the output 85 at time t6 of the address counter 21 (time t7).

When the read address 86 has an effective value, the data buffer 15 reads data from the address indicated by the read address 86 and outputs the data. The encoder 16 receives the data bits from the data buffer 15 and outputs the data bits in accordance with a predetermined format. During this output, the select signal 88 is asserted HIGH.

When the last data bit is read out from the data buffer 15, the buffer empty signal 87 is output (time t9). The address pointer 18 receives the buffer empty signal 87 and renders the read address 86 ineffective (time t10). When the encoder 16 output the last data bit, the select signal 88 is asserted LOW (time t10). In this case, the control circuit 10 recognizes that the encoder 16 has completed output of the data bits and outputs the END portion of a packet in a given time period.

The selector 19 selects and outputs the output of the encoder 16 when the select signal 88 is at the HIGH level. The selector 19 selects and outputs the output of the control circuit 10 when the select signal 88 is at the LOW level. Thus, the repeated output is as shown by the signal 89.

The repeat operation for a single packet is completed at time t11. Then, the control circuit 10 compares the output 8b of the receiving counter 11 with the output 8c of the repeat counter 14. When all packets have been repeated, the process is ended. If not, the control circuit 10 outputs a new PREFIX portion and the above-described processing is repeated.

Figure 8:
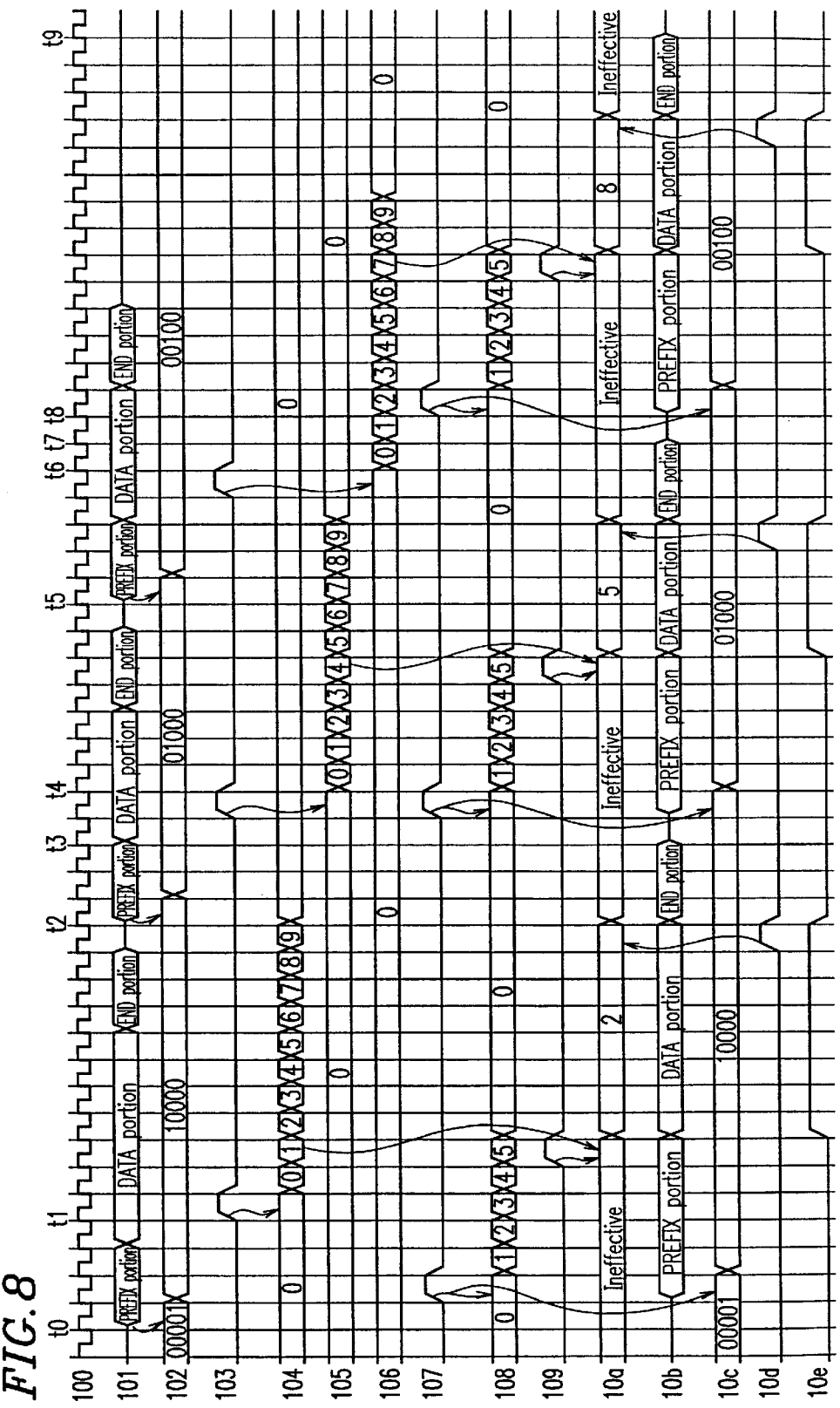
FIG. 8 is a timing chart showing timing of operation in a bus transfer apparatus according to this invention.
Figure 9:
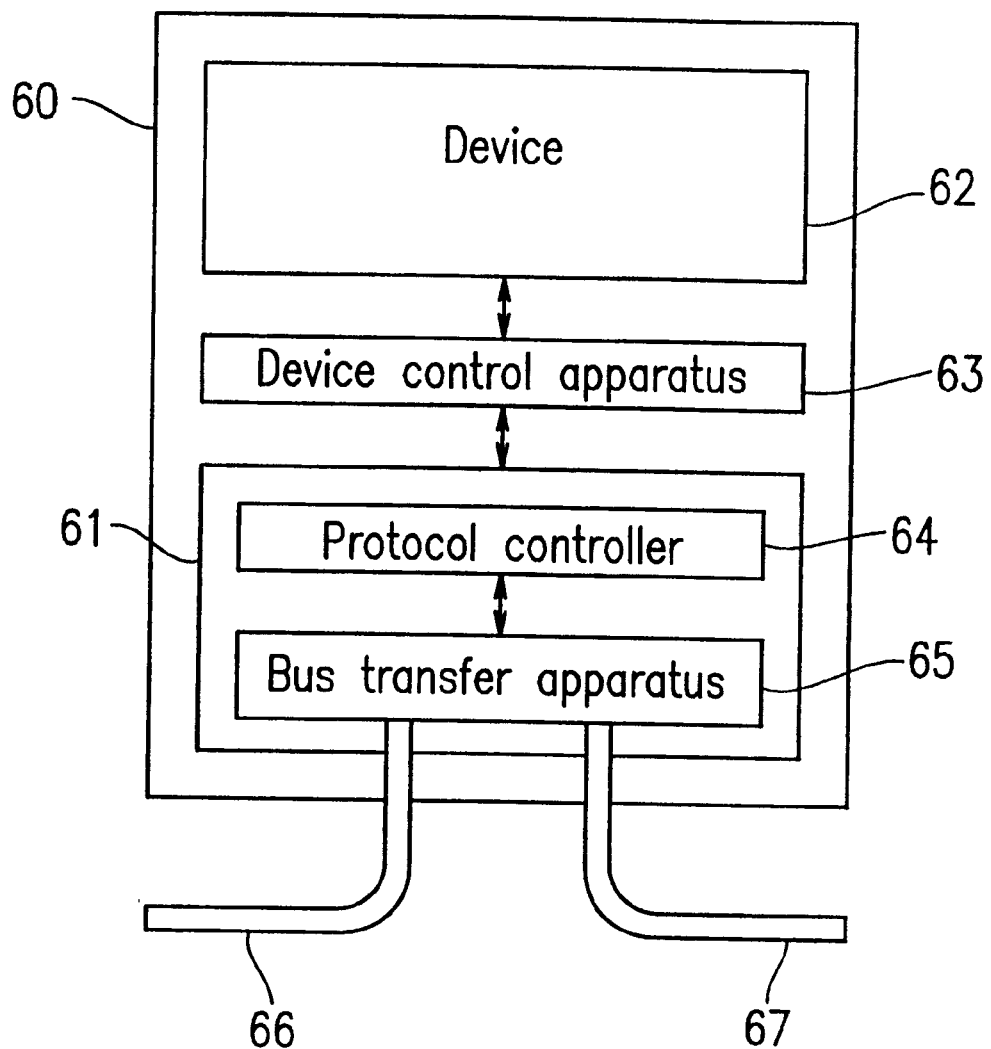
FIG. 9 is a diagram showing a configuration of a component 60 included in a computer system.
Figure 10A:
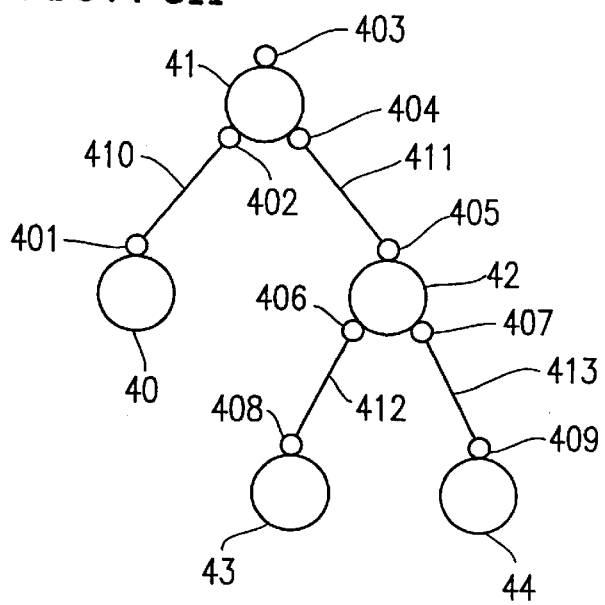
FIG. 10A is a diagram showing a plurality of communication nodes connected with each other via cables.
Figure 10B:
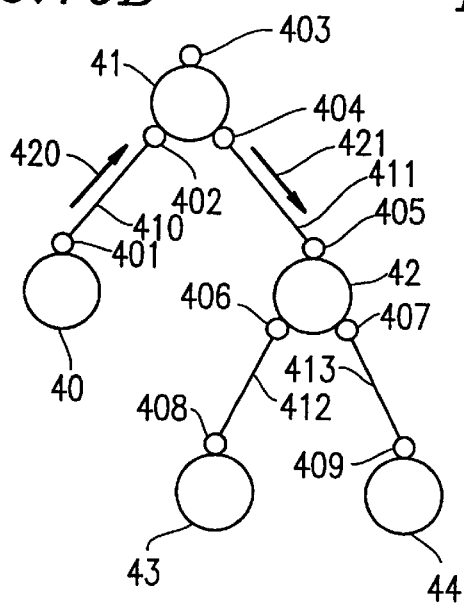
FIG. 10B is a diagram showing a repeat operation by a communication node 41.
Figure 10C:
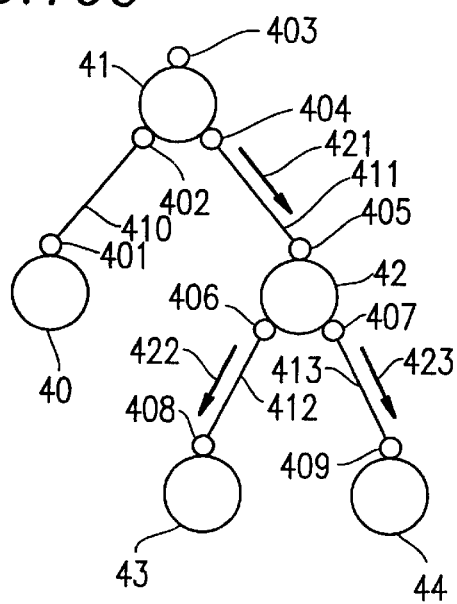
FIG. 10C is a diagram showing a repeat operation by a communication node 42.
Figure 11:
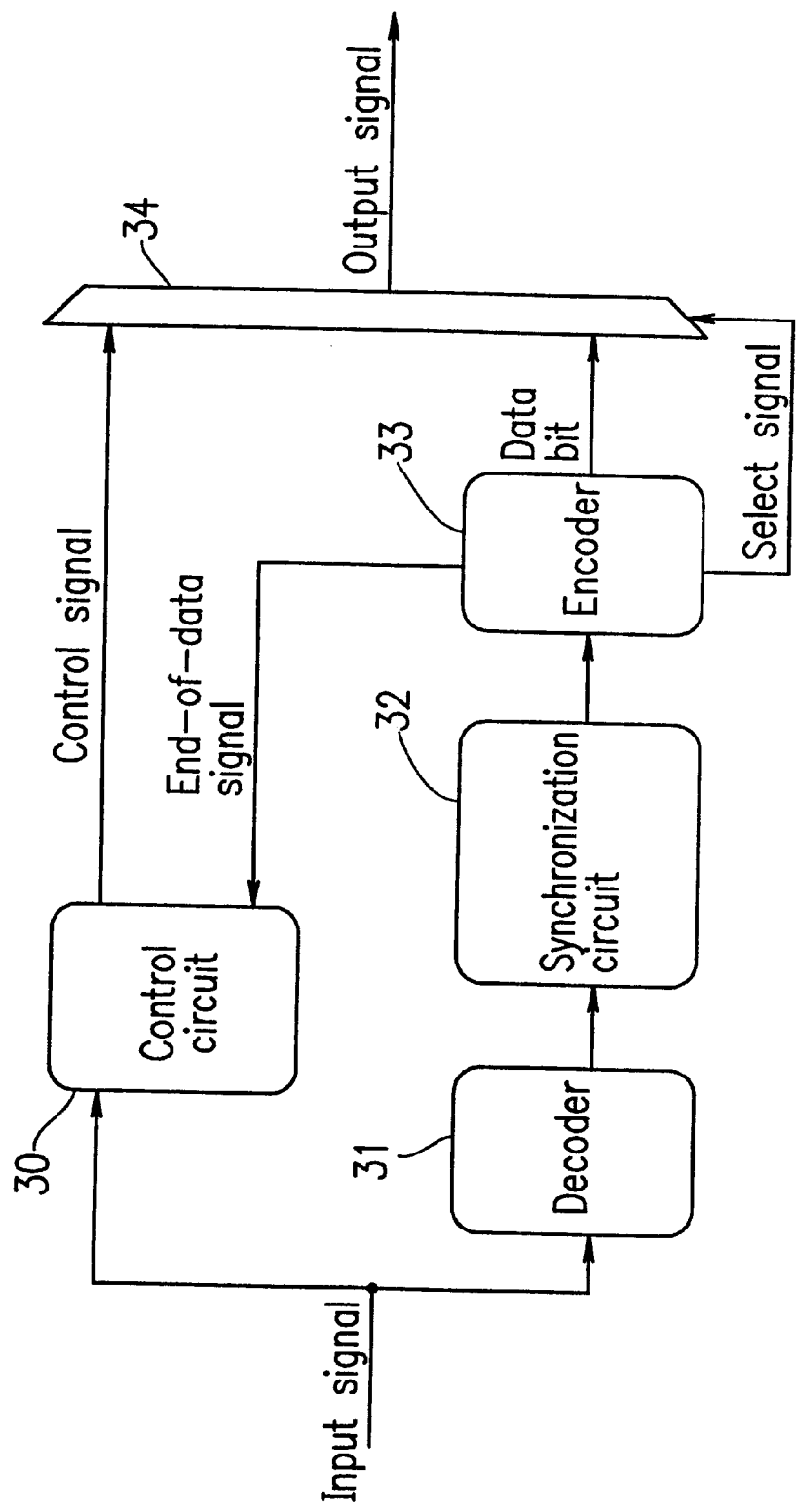
FIG. 11 is a diagram showing a configuration of a conventional bus transfer apparatus.

FIG. 8 is a timing chart indicating the operational timing of the bus transfer apparatus according to this invention when there is a next packet received before the repeat operation for the previous packet is ended. In FIG. 8, reference numeral 100 indicates a system clock signal; reference numeral 101 a packet monitored by a communication node; reference numeral 102 a value of the receiving counter 11 (i.e., the number of received packets which is hereinafter referred to as a received packet number); reference numeral 103 a synchronization initiating trigger signal; reference numeral 104 a value of the address counter 0; reference numeral 105 a value of the address counter 1; reference numeral 106 a value of the address counter 2; reference numeral 107 a trigger signal output by the control signal generating section 131; reference numeral 108 a value of the counter 17; reference numeral 109 a counter full signal; reference numeral 10a a read address; reference numeral 10b a signal output from the selector 19 as a repeated output; reference numeral 10c a value of the repeat counter 14 (i.e., the number of repeated packets which is hereinafter referred to as a repeated packet number); reference numeral 10d a buffer empty signal; reference numeral 10e a select signal output from the encoder 16.

For the sake of simplicity, it is assumed that the receiving counter 11 and the repeat counter 14 each have a five-bit register; and the maximum address of the data buffer 15 is 9.

When the input signal interpreting section 130 receives the PREFIX portion at time t0, the value 102 of the receiving counter 11 is updated to 10000. At this time, the value 10c of the repeat counter 14 is 00001. The control circuit 10 begins the repeat operation and outputs the trigger signal 107. The value 10c of the repeat counter 14 is updated to 10000.

At time t1, the synchronization circuit 13 begins synchronization, outputting the synchronization initiating trigger signal 103. The address pointer 18 initializes the address counter 0 corresponding to the value 102 (10000) of the receiving counter 11 and begins to increment the address counter 0. At this time, the synchronized data bits begin to be held in the data buffer 15. When the incremented address counter 0 reaches the maximum address 9 of the data buffer 15, the address counter 0 is initialized. The increment of the address counter 0 is stopped. Before the end of the increment, the read address 10a has been determined and the DATA portion has been repeated. The process to determine the read address is described above in detail with reference to FIG. 6 and is here omitted.

At time t2, the next packet is received when the END portion of the first packet has not been repeated. The input signal interpreting section 130 informs the receiving counter 11 of reception of the PREFIX portion. The value of the receiving counter 11 is then updated to 01000. At this time, the comparison section 132 begins to inform the control signal generating section 131 of a result from comparison indicating that the received packet number 102 and the repeat packet number 10c are different from each other. At time t2, the control signal generating section 131 receives the buffer empty signal 10d and outputs the END portion. At time t3, the control signal generating section 131 ends the output of the END portion and monitors a result from comparison informed from the comparison section 132. Thereafter, the control signal generating section 131 resumes the repeat operation. When the control signal generating section 131 begins to output the PREFIX portion, the value 10c of the repeat counter 14 is updated to 01000 in the next clock cycle (at time t4). The address pointer 18 receives the synchronization initiating trigger signal from the synchronization circuit 13. The address counter 1 corresponding to the value 102 (01000) of the receiving counter 11 begins operation. As described above, the read address 10a is determined when the value 108 of the counter 17 reaches a predetermined value. The DATA portion is then repeated.

Further, at time t5, the next packet is received. The value 102 of the receiving counter 11 is updated to 00100. At time t7, the control signal generating section 131 ends the repeating of the END portion, and begins the repeat operation since the control signal generating section 131 has received the result from comparison indicating that the received packet number 102 and the repeated packet number 10c are different from each other. At time t8, the trigger signal 107 is output and the value 10c of the repeat counter 14 is updated to 00100. The synchronization circuit 13 has output synchronized data bits since time t6. The address counter 2 corresponding to the value 102 (00100) of the receiving counter 11 has begun operation. Similarly, the repeating of the DATA portion and the END portion is ended at time t9. At this time, the control signal generating section 131 recognizes that all the packets have been repeated since a result from the comparison section 132 indicates that the received packet number 102 and the repeated packet number 10c are the same. The repeat operation is ended.

As described above, the address pointer 18 includes the address counters 0 through (n−1), one of which is selectively in operation. For this reason, even when a new packet is received before the end of the previous repeat operation, it is possible to guarantee the lower limit of the period of time during output of the PREFIX portion of a repeated packet.

In the foregoing description, the period of a system clock signal used in a bus transfer apparatus sending a packet is longer than the period of a system clock signal used in a bus transfer apparatus repeating the packet. In this case, there is a problem in that the length of the PREFIX portion monitored by the bus transfer apparatus repeating the packet is shortened from the actual length. As described above, this invention provides a bus transfer apparatus for solving the problem.

Conversely, the period of a system clock signal used in a bus transfer apparatus sending a packet may be shorter than the period of a system clock signal used in a bus transfer apparatus repeating the packet. In this case, there is a problem in that the length of the PREFIX portion monitored by the bus transfer apparatus repeating the packet is elongated from the actual length. A bus transfer apparatus according to this invention can solve the problem by adjusting a delay amount (delay time) of the PREFIX portion and the trigger signal as the repeat outputs. A delay section 133 (FIG. 2) for adjusting the delay amount of the PREFIX portion is provided in the control circuit 10. A delay section 134 (FIG. 2) for adjusting the delay amount of the trigger signal is provided in the control circuit 10.

The delay amount of the PREFIX portion and the delay amount of the trigger signal must be substantially equal to each other. The delay amount is arbitrarily determined by taking into consideration the length of the PREFIX portion and the period width of the system clock signal. For instance, it is assumed that the PREFIX portion is restricted to a maximum of six clock cycles. When the PREFIX portion having six clock cycles is received, how much is the PREFIX portion shortened or elongated? The maximum number of clock cycles of the shortened or elongated PREFIX portion can be calculated based on the maximum and minimum values of the period of the system clock signal. When the PREFIX portion is elongated to seven clock cycles, the delay amount may be the difference between original PREFIX portion and the elongated PREFIX portion, i.e., one clock cycle.

Figure 7:
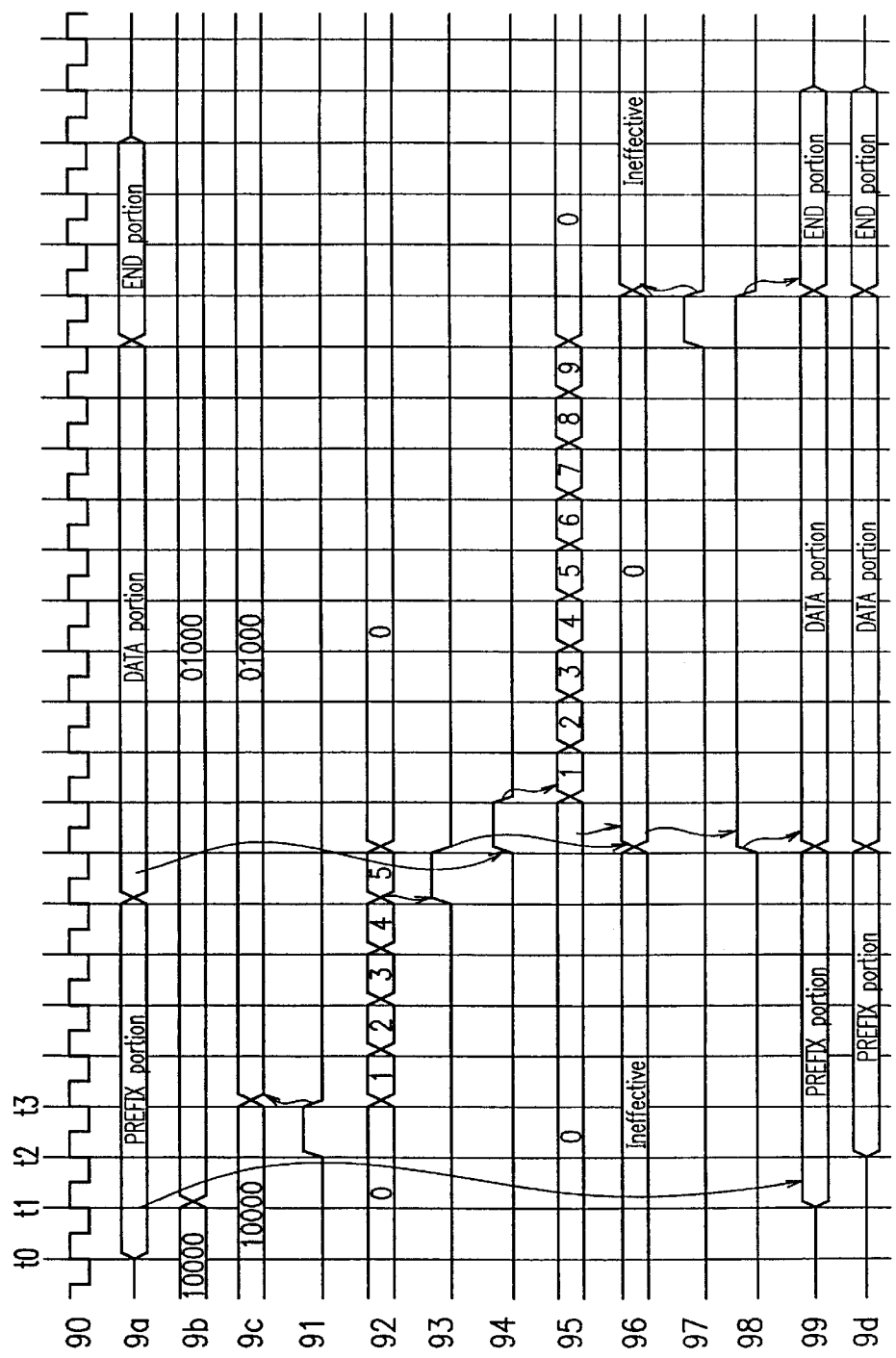
FIG. 7 is a timing chart showing timing of operation in a bus transfer apparatus according to this invention.

This point will be described with reference to FIG. 7. In FIG. 7, reference numeral 90 indicates a system clock signal; reference numeral 91 a trigger signal indicating that the control signal 10 begins to output a control signal; reference numeral 92 a value of the counter 17; reference numeral 93 a counter full signal for indicating that the counter 17 reaches a predetermined value; reference numeral 94 a synchronization initiating trigger signal output by the synchronization circuit 13; reference numeral 95 a value of the address counter 21 counting the number of data bits stored in a data buffer in the address pointer 18; reference numeral 96 a read address; reference numeral 97 a buffer empty signal; reference numeral 98 a select signal output by the encoder 16; reference numeral 99 a signal output from the selector 19 as a repeated output; reference numeral 9a a packet which is received through the receiving port and is latched using the system clock 90; reference numeral 9b is an output of the receiving counter 11 indicating the number of received packets; reference numeral 9c an output of the repeat counter 14 indicating the number of repeated packets; and reference numeral 9d a repeated output signal obtained by delaying initiation of the repeat operation of the PREFIX portion. The timing of outputting each signal is the same as described above. Here, it is assumed that the length of the PREFIX portion is restricted to six clock cycles or less. Under such a restriction, the PREFIX portion which is transmitted as an input signal also has a length of six clock cycles or less. Assuming that the latched packet 9a has a length of seven clock cycles, when the packet 9a is repeated as it is., the output signal 99 has a length of seven clock cycles. To avoid this, a delay of one clock cycle is introduced into a control signal output from the control signal generating section 131 by the time when the control signal generating section 131 repeats and outputs the PREFIX portion. This delay is performed by the delay section 133 (FIG. 2). Similarly, a delay of one clock cycle is introduced into a trigger signal output from the control signal generating section 131 by the time when the control signal generating section 131 outputs the trigger signal. This delay is performed by the delay section 134 (FIG. 2). This allows the PREFIX portion of the output signal 89 to have a length of six clock cycles corresponding to from time t1 to time t2 (signal 9d).

As described above, with the delay sections 133 and 134, the upper limit of the period of time during the outputting of the repeated PREFIX portion can be guaranteed. Accordingly, the upper and lower limits of the period of time during the outputting of the repeated PREFIX portion can be guaranteed in the bus control circuit of this invention.

The control circuit 10 may monitor the synchronization initiating triggering signal output by the synchronization circuit 13. The PREFIX portion may begin to be output when the synchronization initiating triggering signal is transmitted. In this case, the period of time during the outputting of the PREFIX portion can be uniquely determined.

The output signal from the selector of the bus transfer, apparatus of this invention is switched from the PREFIX portion of a packet to the DATA portion of the packet after the counter outputs the counter full signal. The counter full signal is output when the time period during which the control circuit is outputting the PREFIX portion of the packet reaches the predetermined lower limit. This prevents the time period during which the control circuit is outputting the PREFIX portion of the repeated packet from becoming shorter than the lower limit. As a result, the lower limit of the time period during which the control circuit is outputting the PREFIX portion of the repeated packet is guaranteed.

The address pointer includes a plurality of address counters. One of the plurality of address counters is selectively transitioned into an operating state. For this reason, even when a new packet is received before completion of the repeat operation, the lower limit of the time period during which the control circuit is outputting the PREFIX portion of the repeated packet is guaranteed.

The first delaying section for delaying output of the control signal and the second delaying section for delaying output of the trigger signal instructing initiation of the counting are provided in the bus transfer apparatus of this invention. This prevents the time period during which the control circuit is outputting the PREFIX portion of the repeated packet from becoming longer than the upper limit. As a result, the upper limit of the time period during which the control circuit is outputting the PREFIX portion of the repeated packet is guaranteed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A bus transfer apparatus for receiving a packet and repeating the received packet, wherein the packet comprises a PREFIX portion indicating the head of the packet, a DATA portion storing data, and an END portion indicating the end of the packet, the apparatus comprising:
a control circuit for receiving the packet and outputting the PREFIX portion of the packet as a control signal;
a counter for counting a time period during which the control circuit outputs the PREFIX portion, and outputting a counter full signal when the time period reaches a predetermined lower limit;
an address pointer for determining a read address in response to the counter full signal;
a data buffer for holding the DATA portion of the packet and outputting the DATA portion in accordance with the read address;
an encoder for converting the DATA portion output from the data buffer to a predetermined format; and
a first selector for selecting either the PREFIX portion output from the control circuit or the DATA portion output from the encoder,
wherein the output signal from the first selector is switched from the PREFIX portion of the packet to the DATA portion of the packet after the counter full signal is output from the counter.

2. A bus transfer apparatus according to claim 1 further comprising:
a receiving counter for storing the number of received packets; and
a repeat counter for storing the number of repeated packets,
wherein the address pointer comprises:
a plurality of address counters being selectively transitioned into an operating state in accordance with an output from the receiving counter;
a second selector for selecting one of the plurality of address counters in accordance with an output from the repeat counter;
an address holding circuit for holding an output from the second selector and outputting the output from the second selector as a read address in response to the counter full signal.

3. A bus transfer apparatus according to claim 1, wherein the control circuit comprises:
a first delay section for delaying the control signal; and
a second delay section for delaying a trigger signal instructing initiation of counting.

4. A bus transfer apparatus according to claim 2, wherein the control circuit further comprises:
a comparison section for comparing an output from the receiving counter with an output from the repeat counter to determine whether repeat operation of the received packet is completed.

5. A bus transfer apparatus according to claim 1, wherein the encoder outputs an end-of-data signal to the control circuit after converting the DATA portion to the predetermined format.

6. A bus transfer apparatus according to claim 1, wherein the data buffer outputs a buffer empty signal to the address pointer after outputting all the DATA portion held in the data buffer.

7. A bus transfer apparatus according to claim 6, wherein the address pointer renders the read address ineffective in response to the buffer empty signal.

* * * * *